Figure 1:
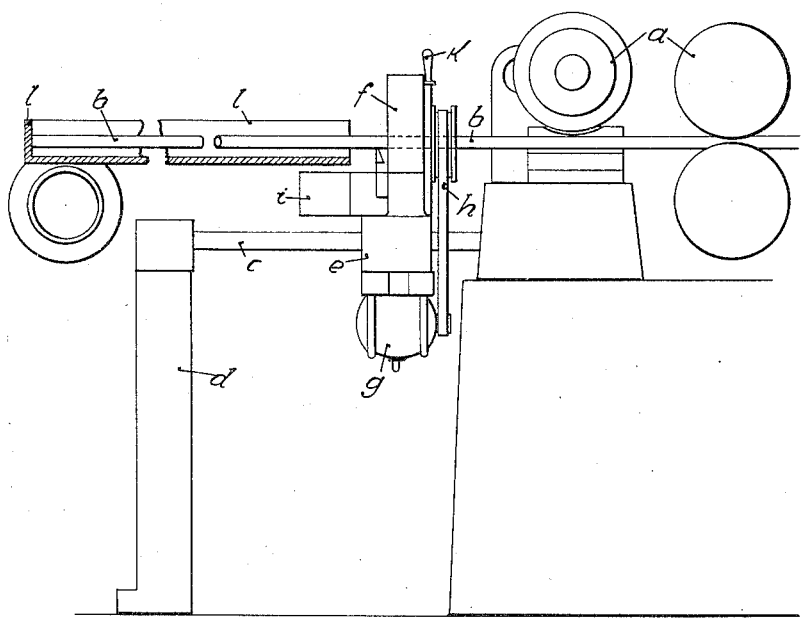

April 26, 1927.

P. GEDIEN ET AL 1,625,850

CUTTING-OFF DEVICE PARTICULARLY FOR TUBES

Filed Oct. 28, 1926

INVENTORS:
Paul Gedien
Karl Schwade
BY: Ruege, Bayer & Bakeler
ATTORNEYS.

Patented Apr. 26, 1927.

1,625,850

UNITED STATES PATENT OFFICE.

PAUL GEDIEN, OF COLOGNE-BRAUNSFELD, AND KARL SCHWADE, OF COLOGNE-LINDENTHAL, GERMANY.

CUTTING-OFF DEVICE PARTICULARLY FOR TUBES.

Application filed October 28, 1926, Serial No. 144,899, and in Germany December 23, 1924.

This invention relates to cutting-off means for use for example with tube-making devices and in particular with tube-welding or shaping devices, the object of the invention being to provide a device of this character which is extremely simple in construction and very efficient in operation.

It has already been proposed to cause the cutting means to move parallel to and at the same speed as a length of tube to be cut off, so that the cutting operation may be effected without necessitating any interruption in the tube welding or forming operations. The known devices of this type, however, have not proved practicable. In some of the devices with which I am familiar a slide carrying the cutting device is connected automatically by a resilient coupling with the length of tube and moves therewith during the cutting operation, after which the resilient coupling must be released by separate devices in order that the slide may return to its original position. This manner of operation necessitates the provision of very complicated and expansive mechanism.

The same result is obtained, according to the present invention, in a simpler and cheaper manner by causing the free end of the length of work, such as tube, to engage directly the cutter-supporting member, thus producing the necessary movement of the cutting tool.

One embodiment of the invention is illustrated by way of example in the accompanying drawing, which is a side elevation of a cutting-off device for use with a tube-making mechanism.

Referring to the drawing, a guide $c$, which is secured at the free end to a support $d$, is mounted at the other end on the base of the welding device $a$ which device feeds forward the length of tube $b$. The slide block $e$ supporting the tube-cutter $f$ is mounted for sliding movement on said guide $c$, and an electric motor $g$ which operates the belt $h$ of the tube-cutting device is secured to the bottom of the supporting slide block $e$. Immediately the tube cutter $f$ has been set by positioning the hand lever $k$ the chuck (not shown in the drawing) of the cutting device grips the tube in known manner. This chuck is provided merely for the purpose of centering the tube in the cutting device. In order that the cutting device shall be moved by and at the same speed as the tube, which is cut by the cutting tool while moving, a channel-shaped extension $l$ is mounted on a bracket $i$ carried by the cutter-supporting slide block $e$, said extension having an end wall disposed in the path of movement of the tube $b$, so that the free end of said tube in its forward movement will engage said wall and cause the cutter-supporting block to slide in parallelism with and at the same speed as the tube. The actuation of the cutting device for the purpose of cutting off the section of tube is effected during this movement, either by hand or in a further automatic operation. This device ensures that all the sections are of precisely equal length.

We claim:—

1. In a tube-cutting device, the combination of tube-feeding means, a cutter-supporting block mounted for sliding movement in parallelism with a tube fed by said feeding means and supporting a cutter in axial alinement with said tube, and means carried by said cutter-supporting block and disposed in position to be engaged by the moving tube thereby to cause sliding movement of said cutter-supporting means.

2. In a tube-cutting device, the combination of tube-feeding means, a cutter-supporting block mounted for sliding movement in parallelism with a tube fed by said feeding means, and an extension projecting from said block in the direction of movement of the tube and having a portion disposed in position to be engaged by the moving tube thereby to cause sliding movement of the cutter-supporting means.

In testimony whereof we have signed our names to this specification.

PAUL GEDIEN.
KARL SCHWADE.